J. M. PITKIN.
JOURNAL BEARING.
APPLICATION FILED AUG. 18, 1919.

1,366,132.

Patented Jan. 18, 1921.

INVENTOR.
J. M. Pitkin,
BY Hazard & Miller
ATTORNEYS.

UNITED STATES PATENT OFFICE.

JAMES M. PITKIN, OF LOS ANGELES, CALIFORNIA.

JOURNAL-BEARING.

1,366,132.  Specification of Letters Patent.  Patented Jan. 18, 1921.

Application filed August 18, 1919. Serial No. 318,305.

*To all whom it may concern:*

Be it known that I, JAMES M. PITKIN, a citizen of the United States, residing at Los Angeles, in the county of Los Angeles and State of California, have invented new and useful Improvements in Journal-Bearings, of which the following is a specification.

My object is to make an improved journal bearing, and my invention consists of the novel features herein shown, described and claimed.

Figure 1:
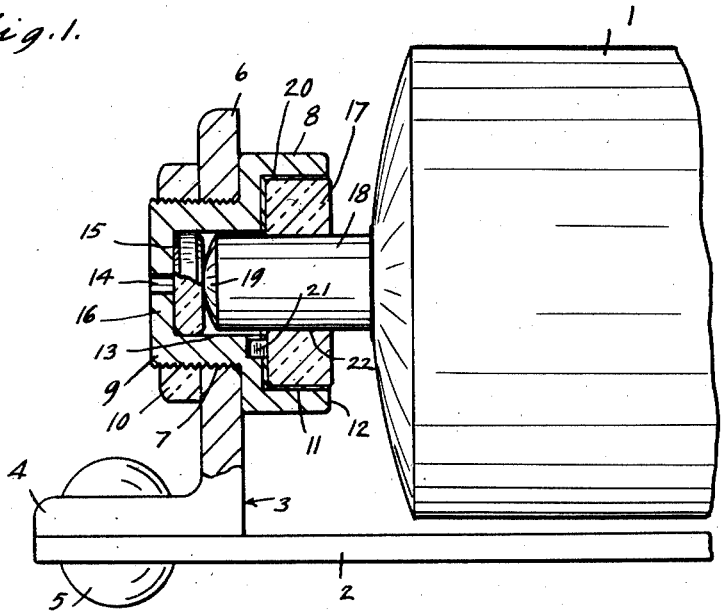
Figure 1 is a fragmentary sectional elevation of a roller having a journal mounted in a bearing embodying the principles of my invention.
Figure 2:
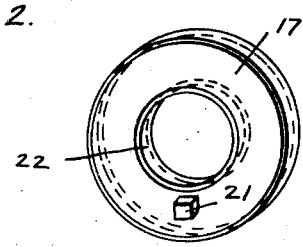
Fig. 2 is a perspective of one of the bearings shown in Fig. 1.

The roller 1 is a part of a gravity roller conveyer.

The frame plate 2 has an angle iron 3 fitting along one side and the horizontal flange 4 of the angle iron is secured to the plate 2 by a rivet 5. The vertical flange 6 of the angle iron has a screw-threaded hole 7. The bearing casing 8 fits against the inner face of the flange 6 and has a screw-threaded nipple 9 fitting in the hole 7 and a nut 10 screwed upon the nipple against the outer face of the flange 6.

A large circular opening 11 is formed from the inner face 12 of the casing 8, and a smaller opening or bore 13 extends from the bottom of the opening 11 into the nipple 9. The small opening 14 is formed from the bottom of the bore 13. A glass disk 15 fits in the bore 13 against the web 16 through which the opening 14 extends.

A glass bearing lining 17 fits in the opening 11 and the journal 18 extends from the roller 1 through the lining 17 and has a rounded end 19 fitting against the flat face of the disk 15. The rounded end 19 and disk 15 form a thrust bearing to hold the journal 18 from moving endwise, and the glass lining 17 forms a supporting bearing in which the journal 18 rotates.

A coating 20 is placed around the lining 17 in the opening 11, said coating being formed of cement, pitch, paint or the like to make a non-metallic setting for the lining 17. A tongue 21 extends from the inner face of the lining 17 into a recess in the casing 8 to hold the lining 17 from rotating in the casing. The journal opening 22 through the lining 17 is molded or ground and polished to make it smooth and to make a good working fit upon the journal 18.

The journal 18 will run against the disk 15 and in the lining 17 with very little friction and very little heat, and for ordinary purposes the bearing need not be oiled.

The glass will wear longer than the ordinary brass bushings or babbitt and will resist the action of acids, rust and so on, and the glasses are cheaper and more easily replaced.

Figure 3:
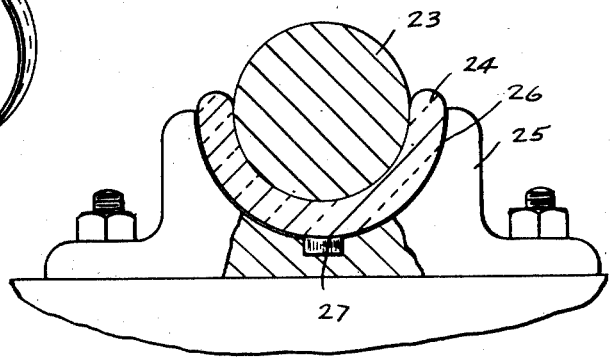
Fig. 3 is a vertical cross section of a modified form of bearing.
Figure 4:
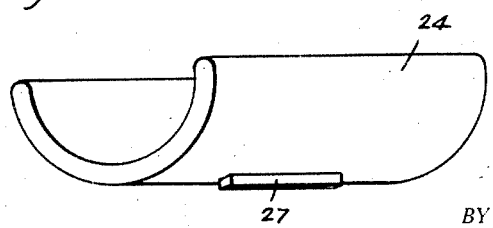
Fig. 4 is a perspective of the bearing shown in Fig. 3.

In the modification shown in Figs. 3 and 4, the journal 23 operates in a half glass bearing 24 supported by a casing 25, there being a cushion 26 between the glass and the iron, and a tongue 27 extends from the glass 24 into a recess in the iron to hold the glass from moving endwise or from being rotated. In this construction the glass 24 takes the place of the ordinary brass or babbitt journal box.

The glasses may be toughened or tempered as desired.

While I have shown two specific forms of journal bearings embodying the principles of my invention, it is to be understood that the glass bearing linings may be used any place where bearing linings are desired.

Various changes may be made without departing from the spirit of my invention as claimed.

I claim:

1. In combination, a support formed with an opening, a cup-shaped bearing casing formed with a reduced portion, closed at its outer end and fitting into said opening, a glass end-thrust bearing in the closed end of said reduced threaded portion, a glass journal bearing in the larger portion of said casing, and a journal in said journal bearing engaging said end-thrust bearing.

2. In combination, a support formed with an opening, a cup-shaped bearing casing formed with a reduced threaded portion, closed at its outer end and fitting into said opening, a glass end-thrust bearing in the closed end of said reduced threaded portion, a glass journal bearing in the larger portion of said casing, and a journal in said journal bearing engaging said end-thrust bearing, one end of said larger portion of said casing engaging one side of said support, and a nut screwing said reduced threaded portion against the other side of said support.

3. In combination, a support formed with an opening, a cup-shaped bearing casing formed with a reduced portion closed at its outer end and fitting into said opening, a glass end-thrust bearing in the closed end of said reduced threaded portion, a glass journal bearing in the larger portion of said casing, and a journal in said journal bearing engaging said end-thrust bearing, the outer end of said reduced portion being provided with an aperture.

4. In combination, a support formed with an opening, a cup-shaped bearing casing formed with a reduced portion, closed at its outer end and fitting into said opening, a glass end-thrust bearing in the closed end of said reduced threaded portion, a glass journal bearing in the larger portion of said casing, and a journal in said journal bearing engaging said end-thrust bearing, the larger portion of said casing having a recess, and a projection on said journal bearing fitting in said recess and preventing said journal bearing from turning.

In testimony whereof I have signed my name to this specification.

JAMES M. PITKIN.